(12) United States Patent
Sunwoo et al.

(10) Patent No.: US 10,341,655 B2
(45) Date of Patent: Jul. 2, 2019

(54) HEVC ENCODING DEVICE AND METHOD FOR DETERMINING INTRA-PREDICTION MODE USING THE SAME

(71) Applicant: AJOU UNIVERSITY INDUSTRY-ACADEMIC COOPERATION FOUNDATION, Suwon-si, Gyeonggi-do (KR)

(72) Inventors: Myung Hoon Sunwoo, Seoul (KR); Tae Sun Kim, Anseong-si (KR)

(73) Assignee: AJOU UNIVERSITY INDUSTRY-ACADEMIC COOPERATION FOUNDATION, Suwon-si (KR)

(*) Notice: Subject to any disclaimer, the term of this patent is extended or adjusted under 35 U.S.C. 154(b) by 169 days.

(21) Appl. No.: 15/130,403

(22) Filed: Apr. 15, 2016

(65) Prior Publication Data

US 2016/0309145 A1 Oct. 20, 2016

(30) Foreign Application Priority Data

Apr. 16, 2015 (KR) ........................ 10-2015-0053862

(51) Int. Cl.
*H04N 19/11* (2014.01)
*H04N 19/593* (2014.01)
*H04N 19/147* (2014.01)

(52) U.S. Cl.
CPC ........... *H04N 19/11* (2014.11); *H04N 19/147* (2014.11); *H04N 19/593* (2014.11)

(58) Field of Classification Search
CPC ..... H04N 19/11; H04N 19/147; H04N 19/593

USPC .................................................. 375/240.12
See application file for complete search history.

(56) References Cited

U.S. PATENT DOCUMENTS

| | | | |
|---|---|---|---|
| 2007/0253484 A1* | 11/2007 | Zhao | H04N 19/176 375/240.13 |
| 2012/0082222 A1* | 4/2012 | Wang | H04N 19/176 375/240.12 |
| 2015/0208090 A1* | 7/2015 | Sakakibara | H04N 19/105 375/240.12 |

(Continued)

FOREIGN PATENT DOCUMENTS

| | | | | |
|---|---|---|---|---|
| JP | 2015035659 A | * | 2/2015 | ............. H04N 7/137 |
| KR | 10-2014-0043014 A | | 4/2014 | |

OTHER PUBLICATIONS

Korean Office Action dated Jan. 29, 2016, issued by the Korean Office Action in corresponding application KR 10-2015-0053862.

(Continued)

*Primary Examiner* — William C Vaughn, Jr.
*Assistant Examiner* — Jae N Noh
(74) *Attorney, Agent, or Firm* — Stein IP, LLC

(57) ABSTRACT

Disclosed is a high efficiency video coding (HEVC) encoding device including a candidate group updater configured to select a plurality of representative modes as a candidate group from among intra-prediction modes and update the candidate group using a plurality of minimum modes selected from the candidate group, the plurality of representative modes each representing a range where there is an optimal mode, and an optimal mode selector configured to select any one mode as an optimal mode from among a plurality of minimum modes selected from the updated candidate group.

20 Claims, 3 Drawing Sheets

(56) References Cited

U.S. PATENT DOCUMENTS

| | | | | |
|---|---|---|---|---|
| 2015/0271491 A1* | 9/2015 | Wang | ................... | H04N 19/159 |
| | | | | 375/240.02 |
| 2015/0341638 A1* | 11/2015 | Francois | ................ | H04N 19/11 |
| | | | | 375/240.12 |
| 2015/0381988 A1* | 12/2015 | Gu | ....................... | H04N 19/119 |
| | | | | 375/240.12 |

OTHER PUBLICATIONS

Korean Office Action dated May 4, 2016, issued by the Korean Office Action in corresponding application KR 10-2015-0053862.
Park, Miso, "Fast Intra Prediction Algorithm with Transform Domain Edge Detection and Mode Grouping in HEVC", Dec. 12, 2014, pp. 1-72.

* cited by examiner

HEVC ENCODING DEVICE AND METHOD FOR DETERMINING INTRA-PREDICTION MODE USING THE SAME

CROSS-REFERENCE TO RELATED APPLICATION

This application claims priority to and the benefit of Korean Patent Application No. 10-2015-0053862, filed on Apr. 16, 2015, the disclosure of which is incorporated herein by reference in its entirety.

BACKGROUND

1. Field

Embodiments of the present disclosure relate to High Efficiency Video Coding (HEVC) encoding technology, and more particularly, to an HEVC encoding device and a method for determining an intra-prediction mode using the same.

2. Discussion of Related Art

Recently, the development of digital TVs (DTVs), mobile devices, various on-line video streaming services, and the like facilitates an access to multimedia content, thereby increasing the demand for high-definition images. Accordingly, high-performance video compression technology is needed to send high-definition images.

High Efficiency Video Coding (HEVC) is a video compression standard having a compression performance two times that of H.264/AVC which is an existing video compression standard. However, the HEVC has a high computational complexity. Recently, research for reducing the computational complexity of the encoder without performance degradation is needed for real-time processing. In particular, motion estimation occupies 70%~80% of the amount of computation in an HEVC encoder, and thus has been a main research field for reducing the computational complexity.

A conventional mode determination algorithm segments a coding unit (CU) from a depth 0 to a depth 3, performs prediction at a prediction unit (PU) level, and determines the size of the CU having an optimal cost function. Because such a method performs PU level prediction for blocks in all cases and calculates a cost function, a computational complexity is increased. Accordingly, a new mode determination method having a low computational complexity is needed.

The related art is disclosed in Korean Patent Application Publication No. 10-2014-0043014, published on Apr. 8, 2014 and entitled "Method and Apparatus for Image Encoding."

SUMMARY

An embodiment of the present disclosure is directed to a high efficiency video coding (HEVC) encoding device that may decrease the number of modes of a candidate group through hierarchy processing by repeatedly updating the candidate group, and reduce a computational complexity of an encoder, and a method of determining an intra-prediction mode using the same.

The present disclosure is not limited to the above-described objective(s), but other objectives not included herein may be clearly understood by those skilled in the art from descriptions below.

According to an aspect of the present disclosure, there is provided an HEVC encoding device including a candidate group updater configured to select a plurality of representative modes as a candidate group from among intra-prediction modes and update the candidate group using a plurality of minimum modes selected from the candidate group, the plurality of representative modes each representing a range where there is an optimal mode; and an optimal mode selector configured to select any one mode as an optimal mode from among a plurality of minimum modes selected from the updated candidate group.

The candidate group updater may set the plurality of representative modes based on a vertical prediction mode, a horizontal prediction mode, and a diagonal prediction mode, which are directional prediction modes included in the intra-prediction modes, and may select the set plurality of representative modes as a first candidate group.

The candidate group updater may set the plurality of representative modes at intervals of 45 degrees based on the directional prediction modes.

The candidate group updater may calculate a rate-distortion cost (RD-cost) for each mode included in the candidate group and may select the plurality of minimum modes from the candidate group based on a result of calculating the RD-cost.

The candidate group updater may select two modes having two smallest RD-costs as first and second minimum modes from among the modes included in the candidate group.

The candidate group updater may update the candidate group by applying variable mode values to the minimum modes depending on a predetermined number of repetitions while proceeding from a second update of the candidate group to a penultimate update of the candidate group.

The candidate group updater may decrease the variable mode values as the number of repetitions increases in order to reduce an interval between modes in the candidate group while the processing proceeds from the second update of the candidate group to the penultimate update of the candidate group.

Upon the penultimate update of the candidate group, the candidate group updater may update a candidate group before the penultimate update by using a DC mode and a planar mode in addition to a plurality of minimum modes selected from the candidate group before the penultimate update.

Upon the last update of the candidate group, the candidate group updater may set at least one segment block having a highest probability of similarity to a current block as a most probable mode (MPM) from among previously predicted segment blocks of the image and select the set MPM as a final candidate group generated by the last update in addition to the plurality of minimum modes.

The optimal mode selector may select any one mode as the optimal mode from among the MPM and the plurality of minimum modes selected from the final candidate group.

The optimal mode selector may select the optimal mode from a final candidate group generated by the last update of the candidate group by using rate-distortion optimization (RDO).

According to another aspect of the present disclosure, there is provided a method of determining an intra-prediction mode using an HEVC encoding device, the method including selecting a plurality of representative modes as a candidate group from among intra-prediction modes, the plurality of representative modes each representing a range where there is an optimal mode; updating the candidate group using a plurality of minimum modes selected from the candidate group; and selecting any one mode as the optimal mode from among a plurality of minimum modes selected from the updated candidate group.

The updating of the candidate group may include setting the plurality of representative modes based on a vertical prediction mode, a horizontal prediction mode, and a diagonal prediction mode, which are directional prediction modes included in the intra-prediction modes; and selecting the set plurality of representative modes as a first candidate group.

The updating of the candidate group may include calculating a rate-distortion cost (RD-cost) for each mode included in the candidate group; and selecting the plurality of minimum modes from the candidate group based on a result of calculating the RD-cost.

The updating of the candidate group may include updating the candidate group by applying variable mode values to the minimum modes depending on a predetermined number of repetitions, while proceeding from a second update of the candidate group to a penultimate update of the candidate group.

The updating of the candidate group may include, upon a penultimate update of the candidate group, updating the candidate group before the penultimate update by using a DC mode and a planar mode in addition a plurality of minimum modes selected from the candidate group before the penultimate update.

The updating of the candidate group may include, upon the last update of the candidate group, setting at least one segment block having a highest probability of similarity to a current block as a most probable mode (MPM) from among previously predicted segment blocks of the image, and selecting the set MPM as a final candidate group generated by the last update in addition to the plurality of minimum modes.

The selecting of any one mode as the optimal mode may include selecting any one mode as the optimal mode from among the MPM and the plurality of minimum modes selected from the final candidate group.

The selecting of any one mode as the optimal mode may include selecting the optimal mode from the final candidate group generated by the last update of the candidate group by using rate-distortion optimization (RDO).

Hereinafter, specific details of other embodiments are included in the detailed description and the accompanying drawings.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION

Figure 1:
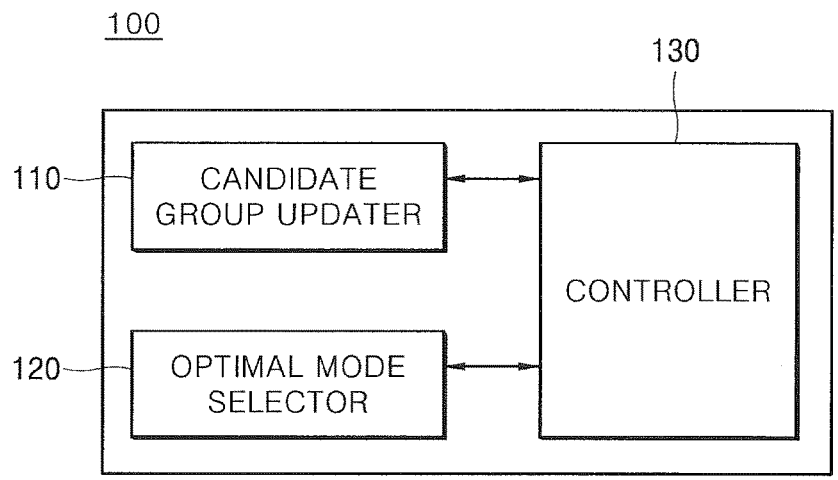
FIG. 1 is a block diagram showing a high efficiency video coding (HEVC) encoding device according to an embodiment of the present disclosure.

Advantages and/or features of the present disclosure, and implementation methods thereof will be clarified through the following embodiments described with reference to the accompanying drawings. The present disclosure may, however, be embodied in different forms and should not be construed as limited to the embodiments set forth herein. Rather, these embodiments are provided so that this disclosure is thorough and complete, and fully conveys the scope of the present disclosure to those skilled in the art. Like reference numerals refer to like elements throughout.

Hereinafter, embodiments of the present disclosure will be described in detail with reference to the accompanying drawings.

FIG. 1 is a block diagram showing a high efficiency video coding (HEVC) encoding device according to an embodiment of the present disclosure.

Referring to FIG. 1, an HEVC encoding device 100 according to an embodiment of the present disclosure may include a candidate group updater 110, an optimal mode selector 120, and a controller 130.

The candidate group updater 110 selects a plurality of representative modes, each of which represents a range where there is an optimal mode, as a candidate group from among intra-prediction modes.

To this end, the candidate group updater 110 may set the plurality of representative modes on the basis of a vertical prediction mode, a horizontal prediction mode, and a diagonal prediction mode, which are directional prediction modes included in the intra-prediction modes, and may select the set plurality of representative modes as a first candidate group.

In this case, the candidate group updater 110 may set the plurality of representative modes at intervals of 45 degrees on the basis of the directional prediction modes.

A process of setting the plurality of representative modes will be described below in detail with reference to FIG. 2. For reference, FIG. 2 is a view showing an intra-prediction mode applied to an embodiment of the present disclosure.

Figure 2:
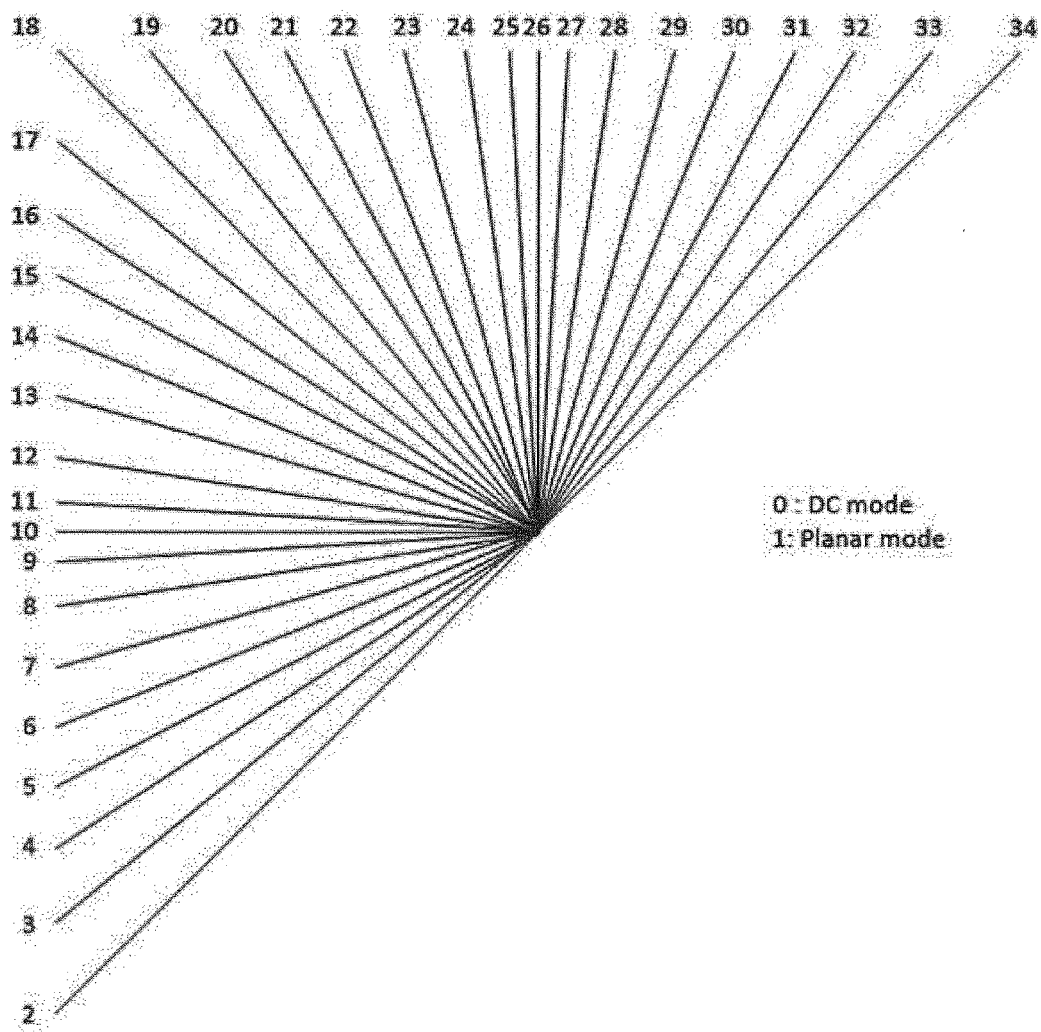
FIG. 2 is a view showing an intra-prediction mode applied to an embodiment of the present disclosure.

As shown in FIG. 2, the intra-prediction modes of an HEVC have a total of 35 prediction modes, including one planar prediction mode, one DC prediction mode, and 33 directional prediction modes, with respect to a luminance signal.

The candidate group updater 110 may set a plurality of representative modes for generating a first candidate group using the intra-prediction modes as shown in FIG. 2. For example, the candidate group updater 110 may set five modes, that is, {2, 10, 18, 26, 34}, as the representative modes from among the intra-prediction modes as shown in FIG. 2.

The five modes, that is, {2, 10, 18, 26, 34}, may segment all modes into four ranges and may each represent a vertical line, a horizontal line, or a diagonal line. Thus, the five modes, that is, {2, 10, 18, 26, 34}, may be selected as a first candidate group.

Here, mode 2 represents {2, 3, 4, 5, 6}, and mode 34 represents {30, 31, 32, 33, 34}. In addition, mode 10, mode 18, and mode 26 represent {6, 7, 8, 9, 10, 11, 12, 13, 14}, {14, 15, 16, 17, 18, 19, 20, 21, 22}, and {22, 23, 24, 25, 26, 27, 28, 29, 30}, respectively. Representative modes may share one mode with their neighboring representative mode.

For example, representative mode 2 may share mode 6 with representative mode 10. Representative mode 10 may share mode 14 with representative mode 18. Representative mode 18 may share mode 22 with representative mode 26. Representative mode 26 may share mode 30 with representative mode 34.

As described above, upon setting the representative mode, the candidate group updater 110 may perform processing such that each representative mode shares at least one mode with its neighboring representative mode.

The candidate group updater 110 selects a plurality of minimum modes from the candidate group.

That is, the candidate group updater 110 may calculate a rate-distortion cost (RD-cost) for each mode included in the candidate group and may select the plurality of minimum modes from the candidate group on the basis of a result of calculating the RD-cost.

In this case, the candidate group updater 110 may select two modes having the two smallest RD costs as a first minimum mode (FMM) and a second minimum mode (SMM) from among the modes included in the candidate group. Here, the FMM is a mode having the smallest RD-cost, and the SMM is a mode having the second smallest RD-cost.

The candidate group updater 110 updates the candidate group using the selected plurality of minimum modes.

In this case, the candidate group updater 110 may update the candidate group by applying variable mode values to the minimum modes depending on a predetermined number of repetitions while proceeding from a second update of the candidate group to a penultimate update of the candidate group.

For example, assume that the number i of repetitions is within the range of one to five, and when i=1, a candidate group, that is, a first candidate group $CS_1$ is {2, 10, 18, 26, 34}. In this case, when the FMM and the SMM selected from the $CS_1$ are mode 18 and mode 26, the candidate group updater 110 may apply the variable mode value, which is ±4, to the FMM and the SMM (that is, FMM±4 and SMM±4) to update a second candidate group $CS_2$ which is a candidate group when i=2. That is, the second candidate group $CS_2$ may be updated to {14, 18, 22, 26, 30}.

The candidate group updater 110 applies the above-described update process to a case when i=3 and a case when i=4. The variable mode value is applied as ±2 when i=3, and is applied as ±1 when i=4. However, when i=4, the DC mode and the planar mode may be applied together.

That is, upon the penultimate update of the candidate group (i.e., i=4), the candidate group updater 110 may update a candidate group before the penultimate update ($CS_3$) by using the DC mode and the planar mode in addition to the minimum modes selected from the candidate group before the penultimate update.

For example, assuming that the candidate group $CS_3$ is {20, 22, 24, 26, 28}, and the minimum modes selected from the candidate group $CS_3$ are mode 24 and mode 26, the candidate group updater 110 may apply the variable mode value ±1 when i=4 to the minimum modes 24 and 26 to select {23, 24, 25, 26, 27} and may add the DC mode and the planar mode thereto to determine a candidate group when i=4 ($CS_4$) as {23, 24, 25, 26, 27, DC, planar}.

As described above, as the number of repetitions increases, the candidate group updater 110 may decrease and then apply the variable mode value. Thus, an interval between modes in the candidate group decreases while the processing proceeds from the second update of the candidate group to the penultimate update of the candidate group.

For example, assuming that $CS_1$={2, 10, 18, 26, 34} and $CS_2$={14, 18, 22, 26, 30}, a mode represented by mode 18 of $CS_1$ is within the range of 14 to 22, and a mode represented by mode 18 of $CS_2$ is within the range of 16 to 20.

Accordingly, according to an embodiment of the present disclosure, an environment in which an optimal mode may be determined more accurately may be provided by reducing a range that is represented by a single mode.

As described above when the total number of repetitions is 5 as shown in the above examples, the candidate group updater 110 may select an $i^{th}$ FMM and an $i^{th}$ SMM using an equation for calculating the RD-cost, such as Equation 1, when i is less than 5 (i.e., i=1 to 4) and may update a candidate group $CS_1$ using Equation 2 when the number i of repetitions is from two to four.

$$J = SATD + \lambda * B_{mode} \quad \text{[Equation 1]}$$

where J is a result of calculating RD-cost, SATD is a difference between an interpolated value and an original value, λ is a Lagrangian constant according to a quantization constant, and $B_{mode}$ is a bit that represents a mode.

$$CS_i = \{x | x = FMM_{i-1} \pm 2^{4-i}, x = SMM_{i-1} \pm 2^{4-i}, x = FMM_{i-1}, x = SMM_{i-1}, i=2,3,4\} \quad \text{[Equation 2]}$$

where $\pm 2^{4-i}$ is a variable mode value.

Upon the last update of the candidate group, the candidate group updater 110 may select a plurality of minimum modes from the candidate group before the penultimate update to determine the plurality of minimum modes as a final candidate group.

Additionally, with reference to the above examples, when $CS_4$={23, 24, 25, 26, 27, DC, Planar}, the candidate group updater 110 may select $FMM_4$ and $SMM_4$ as a final candidate group $CS_5$ through calculation of a rate-distortion optimization (RDO) cost of each mode included in $CS_4$.

As another embodiment, the candidate group updater 110 may set at least one segment block having a highest probability of similarity to the current block as an MPM from among previously predicted segment blocks of the image. The candidate group updater 110 may set the MPM as a final candidate group generated by the last update in addition to the plurality of minimum modes.

Figure 3:
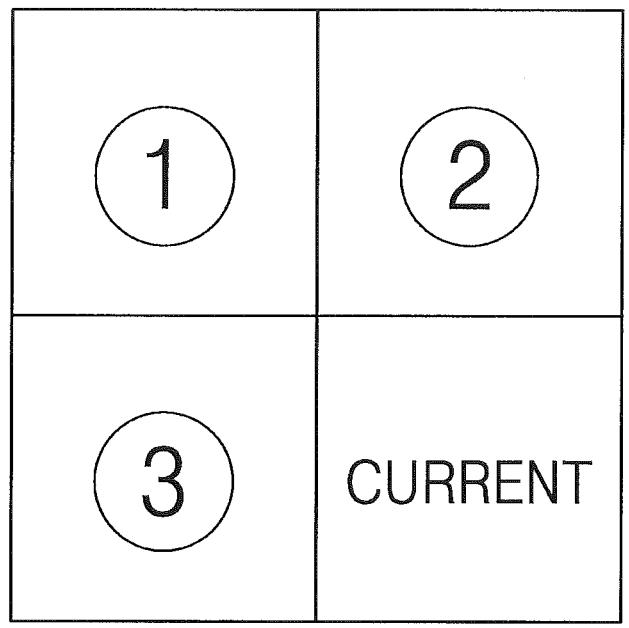
FIG. 3 is an exemplary diagram illustrating an example in which a most probable mode (MPM) is set as a candidate group according to an embodiment of the present disclosure.

For example, as shown in FIG. 3, when the segment blocks having a highest probability of similarity to the current block among the previously predicted segment blocks of the image are ①, ②, and ③, the candidate group updater 110 may set the segment blocks ①, ②, and ③ as the MPMs, and may select the set MPMs as the final candidate group $CS_5$ in addition to an $FMM_4$ and an $SMM_4$. For reference, FIG. 3 is an exemplary diagram showing an example in which an MPM is set as a candidate group according to an embodiment of the present disclosure.

The optimal mode selector 120 selects any one mode as an optimal mode from among a plurality of minimum modes selected from a candidate group updated by the candidate group updater 110.

That is, the optimal mode selector 120 may select any one mode as the optimal mode between an FMM and an SMM selected from the final candidate group that is finally updated by the candidate group updater 110.

In this case, the optimal mode selector 120 may select the optimal mode from the final candidate group by using RDO.

That is, as described above, the optimal mode selector 120 may perform the RDO to select any one of the $FMM_4$ and the $SMM_4$ as the optimal mode.

As another embodiment, the optimal mode selector 120 may select any one mode as an optimal mode from among an MPM and a plurality of minimum modes selected as a final candidate group by the candidate group updater 110.

In this case, the optimal mode selector 120 may select the optimal mode from the final candidate group (MPM, $FMM_4$, and $SMM_4$) using RDO.

The controller 130 may control overall operations of the HEVC encoding device 100 according to an embodiment of the present disclosure, that is, the candidate group updater 110, the optimal mode selector 120, etc.

Figure 4:
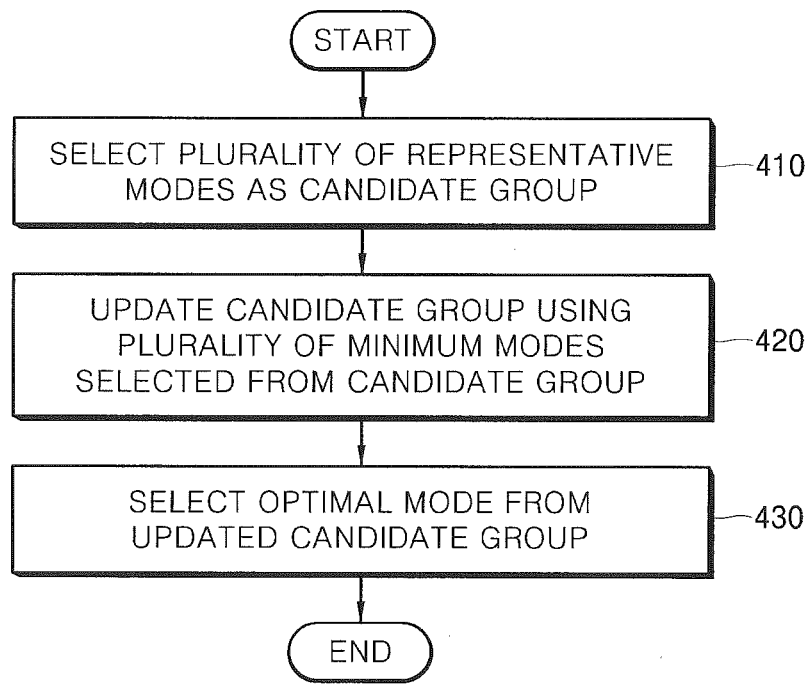
FIGS. 4 and 5 are flowcharts illustrating a method of determining an intra-prediction mode using an HEVC encoding device according to an embodiment of the present disclosure.
Figure 5:
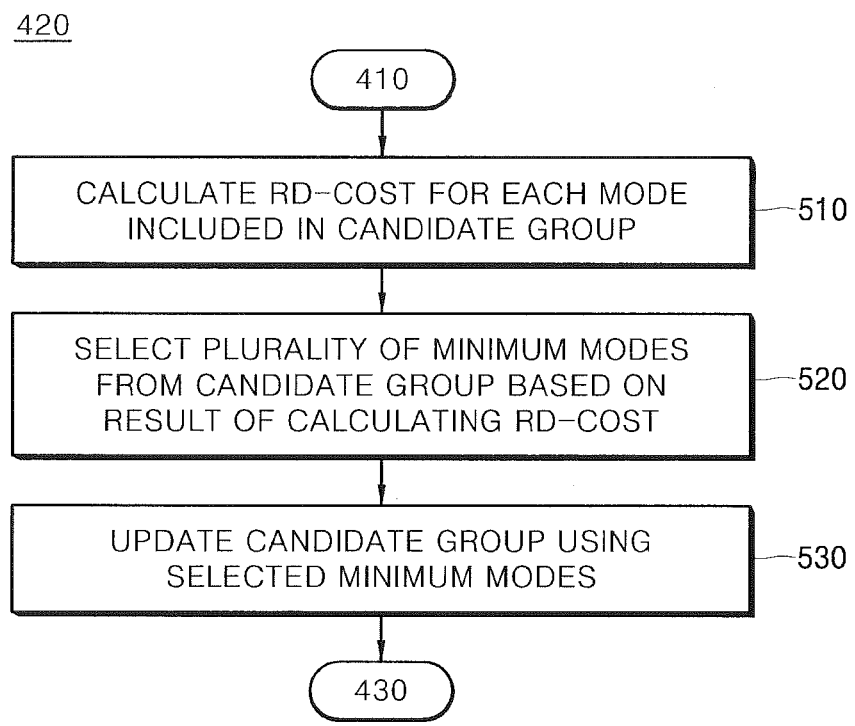

FIGS. 4 and 5 are flowcharts illustrating a method of determining an intra-prediction mode using an HEVC encoding device according to an embodiment of the present disclosure.

First, referring to FIGS. 1 and 4, in S410, an HEVC encoding device 100 selects a plurality of representative modes, each of which represents a range where there is an optimal mode, from among intra-prediction modes.

That is, the HEVC encoding device 100 may set the plurality of representative modes on the basis of a vertical prediction mode, a horizontal prediction mode, and a diagonal prediction mode, which are directional prediction modes included in the intra-prediction modes, and may select the set plurality of representative modes as a first candidate group.

In this case, the HEVC encoding device 100 may set the plurality of representative modes at intervals of 45 degrees on the basis of the directional prediction modes.

Next, in S420, the HEVC encoding device 100 updates the candidate group using a plurality of minimum modes selected from the candidate group.

An update process for the candidate group will be described below in detail with reference to FIG. 5.

That is, referring to FIGS. 1 and 5, in S510, the HEVC encoding device 100 may calculate an RD-cost for each mode included in the candidate group.

Subsequently, in S520, the HEVC encoding device 100 may select a plurality of minimum modes from the candidate group on the basis of a result of calculating the RD-cost.

For example, the HEVC encoding device 100 may select two modes having the two smallest RD-costs as an FMM and an SMM from among the modes included in the candidate group.

Subsequently, in S530, the HEVC encoding device 100 may update the candidate group using the selected minimum modes.

In this case, the HEVC encoding device 100 may update the candidate group by applying variable mode values to the minimum modes depending on a predetermined number of repetitions, while proceeding from a second update of the candidate group to the penultimate update of the candidate group.

Here, the variable mode value may decrease as the number of repetitions increases. Thus, an interval between modes in the candidate group decreases from the second update of the candidate group to the penultimate update of the candidate group.

Accordingly, according to an embodiment of the present disclosure, an environment in which an optimal mode may be determined more accurately may be provided because the interval between modes in the candidate group decreases as the update process for the candidate group is repeated.

Upon the penultimate update of the candidate group, the HEVC encoding device 100 may update a candidate group before the penultimate update, by using a DC mode and a planar mode in addition to the plurality of minimum modes selected from the candidate group before the penultimate update.

In addition, upon the last update of the candidate group, the HEVC encoding device 100 may set at least one segment block having a highest probability of similarity to the current block as an MPM from among previously predicted segment blocks of the image and may select the set MPM as a final candidate group generated by the last update in addition the plurality of minimum modes.

Referring back to FIGS. 1 and 4, in S430, the HEVC encoding device 100 selects any one mode as the optimal mode from among the plurality of minimum modes selected from the updated candidate group (i.e., the final candidate group).

In this case, the HEVC encoding device 100 may select the optimal mode from the final candidate group generated by the last update of the candidate group by using RDO.

As another embodiment, the HEVC encoding device 100 may select any one of the plurality of minimum modes selected from the final candidate group and the set MPMs selected according to similarity to the current block.

According to an embodiment of the present disclosure, an HEVC encoding device that may decrease the number of modes of a candidate group through hierarchy processing by repeatedly updating the candidate group and reduce a computational complexity of an encoder, and a method of determining an intra-prediction mode using the same may be provided.

According to an embodiment of the present disclosure, high-definition images may also be processed in real time by reducing the computational complexity of the encoder.

Embodiments of the present disclosure include a computer-readable recording medium including a program command for performing an operation implemented in various computers. The computer-readable recording medium may include any one or a combination of a program instruction, a local data file, a local data structure, etc. The computer-readable recording medium may be designed and configured specifically for the present disclosure or can be publicly known and available to those who are skilled in the field of computer software. Examples of the computer-readable storage medium include a magnetic medium, such as a hard disk, a floppy disk, and a magnetic tape, an optical recording medium, such as a compact disc read-only memory (CD-ROM) and a digital versatile disc (DVD), a magneto-optical medium, such as a floptical disk, and a hardware device specially configured to store and perform a program instruction, such as a ROM, a random access memory (RAM), and a flash memory. Examples of the program instructions include machine codes made by, for example, a compiler, as well as high-level language codes executable by a computer, using an interpreter.

It should be understood that although exemplary embodiments of the present disclosure have been described above, various modifications may be made without departing from the spirit or scope of the present disclosure. Thus, the scope of the present disclosure is to be determined by the following claims and their equivalents, and is not to be restricted or limited by the foregoing detailed description.

While a few exemplary embodiments have been shown and described with reference to the accompanying drawings, it should be apparent to those skilled in the art that various modifications and variations can be made from the foregoing descriptions. Accordingly, it should be understood that the scope of the present disclosure is to be determined by the following claims and their equivalents.

What is claimed is:

1. A high efficiency video coding (HEVC) encoding device for determining an intra-prediction mode of an image, the HEVC encoding device comprising:
    a candidate group updater configured to select a plurality of representative modes as a candidate group from among intra-prediction modes and update the candidate group using a plurality of minimum modes selected from the candidate group, the plurality of representative modes representing a range where there is an optimal mode; and an optimal mode selector configured to select any one mode as an optimal mode from among a plurality of minimum modes selected from the updated candidate group, wherein, upon the penultimate update of the candidate group, the candidate group updater updates a candidate group before the penultimate update by using a DC mode and a planar mode in addition to a plurality of minimum modes selected from the candidate group before the penultimate update, wherein the candidate group updater updates the candidate group by adding and subtracting variable mode values to/from each of the plurality of minimum modes, while proceeding from a second update of the candidate group to a penultimate update of the candidate group, wherein the variable mode value is decreased by a predetermined ratio as a number of update repetition is increased.

2. The HEVC encoding device of claim 1, wherein the candidate group updater sets the plurality of representative modes based on a vertical prediction mode, a horizontal prediction mode, and a diagonal prediction mode, which are directional prediction modes included in the intra-prediction modes, and selects the set plurality of representative modes as a first candidate group.

3. The HEVC encoding device of claim 2, wherein the candidate group updater sets the plurality of representative modes at intervals of 45 degrees based on the directional prediction modes.

4. The HEVC encoding device of claim 1, wherein the candidate group updater calculates a rate-distortion cost (RD-cost) for each of plural modes included in the candidate group and selects the plurality of minimum modes from the candidate group based on a result of calculating the RD-cost.

5. The HEVC encoding device of claim 4, wherein the candidate group updater selects two modes having two smallest RD-costs as first and second minimum modes from among the plural modes included in the candidate group.

6. The HEVC encoding device of claim 1, wherein the candidate group updater decreases the variable mode values as the number of repetitions increases in order to reduce an interval between modes in the candidate group, from the second update of the candidate group to the penultimate update of the candidate group.

7. The HEVC encoding device of claim 1, wherein, upon the last update of the candidate group, the candidate group updater sets at least one segment block having a highest probability of similarity to a current block as a most probable mode (MPM) from among previously predicted segment blocks of the image and selects the set MPM as a final candidate group generated by the last update in addition to the plurality of minimum modes.

8. The HEVC encoding device of claim 7, wherein the optimal mode selector selects any one mode as the optimal mode from among the MPM and the plurality of minimum modes selected as the final candidate group.

9. The HEVC encoding device of claim 1, wherein the optimal mode selector selects the optimal mode from the final candidate group generated by the last update of the candidate group by using rate-distortion optimization (RDO).

10. A method of determining an intra-prediction mode using a high efficiency video coding (HEVC) encoding device, the method comprising:

selecting, by a candidate group updater, a plurality of representative modes as a candidate group from among intra-prediction modes, the plurality of representative modes representing a range where there is an optimal mode;

updating, by the candidate group updater, the candidate group using a plurality of minimum modes selected from the candidate group; and selecting, by an optimal mode selector, any one mode as the optimal mode from among a plurality of minimum modes selected from the updated candidate group, wherein the updating of the candidate group comprises, upon a penultimate update of the candidate group, updating, by the candidate group updater, a candidate group before the penultimate update by using a DC mode and a planar mode in addition to a plurality of minimum modes selected from the candidate group before the penultimate update, wherein the updating of the candidate group comprises updating the candidate group by adding and subtracting variable mode values to/from each of the plurality of minimum modes, while proceeding from a second update of the candidate group to a penultimate update of the candidate group, wherein the variable mode value is decreased by a predetermined ratio as a number of update repetition is increased.

11. The method of claim 10, wherein the updating of the candidate group comprises:

setting the plurality of representative modes based on a vertical prediction mode, a horizontal prediction mode, and a diagonal prediction mode, which are directional prediction modes included in the intra-prediction modes; and selecting the set plurality of representative modes as a first candidate group.

12. The method of claim 10, wherein the updating of the candidate group comprises:

calculating a rate-distortion cost (RD-cost) for each of plural modes included in the candidate group; and selecting the plurality of minimum modes from the candidate group based on a result of calculating the RD-cost.

13. The method of claim 10, wherein the updating of the candidate group comprises:

upon the last update of the candidate group, setting at least one segment block having a highest probability of similarity to a current block as a most probable mode (MPM) from among previously predicted segment blocks of the image; and selecting the set MPM as a final candidate group generated by the last update in addition to the plurality of minimum modes.

14. The method of claim 13, wherein the selecting of any one mode as the optimal mode comprises selecting any one mode as the optimal mode from among the MPM and the plurality of minimum modes selected from the final candidate group.

15. The method of claim 10, wherein the selecting of any one mode as the optimal mode comprises selecting the optimal mode from the final candidate group generated by the last update of the candidate group by using rate-distortion optimization (RDO).

16. The HEVC encoding device of claim 4, wherein the RD-cost is calculated by:

$$J=SATD+\lambda*Bmode,$$

wherein J is a result of calculating the RD-coat, SATD is a difference between an interpolated value and an original value, λ is a Lagrangian constant according to a quantization constant, and Bmode is a bit that represents a mode.

17. The HEVC encoding device of claim 1, wherein the candidate group updater selects the plurality of minimum modes from the candidate group before the penultimate update based on a below equation:

$$CSi=\{x|x=FMMi-1\pm24-i, x=SMMi-1\pm24-i, x=FMMi-1, x=SMMi-1, i=2,3,4\}$$

wherein the CSi is i-th candidate group, the FMMi−1 is (i−1)-th the first minimum mode, the SMMi−1 is (i−1) the second minimum mode, and ±24−i is the variable mode value.

18. The method of claim 12, wherein the RD-cost is calculated by: $J=SATD+\lambda*Bmode$, wherein J is a result of calculating the RD-coat, SATD is a difference between an interpolated value and an original value, λ is a Lagrangian constant according to a quantization constant, and Bmode is a bit that represents a mode.

19. The method of claim 10, wherein the candidate group updater selects the plurality of minimum modes from the candidate group before the penultimate update based on a below equation:

$$CSi=\{x|x=FMMi-1\pm24-i, x=SMMi-1\pm24-i, x=FMMi-1, x=SMMi-1, i=2,3,4\}$$

wherein the CSi is i-th candidate group, the FMMi−1 is (i−1)-th the first minimum mode, the SMMi−1 is (i−1) the second minimum mode, and ±24−i is the variable mode value.

20. A high efficiency video coding (HEVC) encoding device for determining an intra-prediction mode of an image, the HEVC encoding device comprising:

a candidate group updater configured to select a plurality of representative modes as a candidate group from among intra-prediction modes, select N modes on basis of a result of calculating a rate-distortion cost (RD-cost) for each mode included in the candidate group, the N mode having the N-th smallest RD-cost and update the candidate group using the selected N modes, the plurality of representative modes each representing a vertical line, a horizontal line or a diagonal line; and an optimal mode selector configured to select any one mode from among the N modes selected from the updated candidate group, wherein, upon the penultimate update of the candidate group, the candidate group updater updates a candidate group before the penultimate update by using a DC mode and a planar mode in addition to a plurality of minimum modes selected from the candidate group before the penultimate update, wherein each of the plurality of representative modes shares one mode with their neighboring representative mode when the candidate group updater selects the plurality of representative modes, when the candidate group updater updates the candidate group, the candidate group updater applies variable mode values to each of the N modes depending on a predetermined number of repetitions while proceeding from a second update of the candidate group to a penultimate update of the candidate group and decreases the variable mode values as the number of repetitions increases in order to reduce an interval between modes in the candidate group, from the second update of the candidate group to the penultimate update of the candidate group.

* * * * *